(12) United States Patent
Siminoff

(10) Patent No.: US 8,416,927 B2
(45) Date of Patent: Apr. 9, 2013

(54) SYSTEM AND METHOD FOR LIMITING VOICEMAIL TRANSCRIPTION

(75) Inventor: James Siminoff, Miami Beach, FL (US)

(73) Assignee: Ditech Networks, Inc., San Jose, CA (US)

( * ) Notice: Subject to any disclaimer, the term of this patent is extended or adjusted under 35 U.S.C. 154(b) by 1393 days.

(21) Appl. No.: 12/101,672

(22) Filed: Apr. 11, 2008

(65) Prior Publication Data

US 2008/0260114 A1    Oct. 23, 2008

Related U.S. Application Data

(60) Provisional application No. 60/911,437, filed on Apr. 12, 2007.

(51) Int. Cl.
*H04M 1/64* (2006.01)

(52) U.S. Cl.
USPC ............ 379/88.14; 379/142.14; 455/412.1; 455/413; 704/235

(58) Field of Classification Search ........... 379/88.14, 379/142.14; 455/412.1, 413; 704/235
See application file for complete search history.

(56) References Cited

U.S. PATENT DOCUMENTS

| | | | |
|---|---|---|---|
| 5,537,457 | A | 7/1996 | Lantto et al. |
| 5,768,509 | A | 6/1998 | Gunluk |
| 6,308,329 | B1 | 10/2001 | Takahashi |
| 6,490,561 | B1 | 12/2002 | Wilson et al. |
| 6,507,643 | B1 * | 1/2003 | Groner ............... 379/88.14 |
| 6,633,764 | B1 | 10/2003 | Garcia |
| 6,937,983 | B2 | 8/2005 | Romero |
| 7,016,844 | B2 | 3/2006 | Othmer et al. |
| 7,046,995 | B2 | 5/2006 | Rygaard |
| 7,130,401 | B2 * | 10/2006 | Rampey et al. ......... 379/142.14 |
| 7,143,441 | B2 | 11/2006 | Rygaard |
| 7,164,753 | B2 | 1/2007 | Engelke et al. |
| 7,167,861 | B2 | 1/2007 | Majumder et al. |

(Continued)

FOREIGN PATENT DOCUMENTS

EP    1528539 A1    5/2005

OTHER PUBLICATIONS

Burdick, Justin, "Building a Regionally Inclusive Dictionary for Speech Recognition," Computer Science & Linguistics, Spring 2004, pp. 1-5.

(Continued)

*Primary Examiner* — Simon Sing
*Assistant Examiner* — Van D Huynh
(74) *Attorney, Agent, or Firm* — Holland & Knight LLP; Mark H. Whittenberger

(57) ABSTRACT

Methods and systems for limiting voicemail transcription. The methods include answering a forwarded call from a caller to a subscriber of the voicemail transcription service, outputting an audio message to the caller prompting for the caller to leave a voicemail message, recording the voicemail message from audio of the forwarded call, and transcribing the audio of the forwarded call into text. The step of transcribing may be limited according to one or more of the following criteria: the duration of the recording, the number of characters transcribed, the number of text messages generated and filled from transcribed text, the caller ID of the call, the time the call is received, and the duration of the transcription. The systems include a call handler and a transcriber. At least one of the methods may be embodied by a software product including instructions for executing the steps of the method.

8 Claims, 7 Drawing Sheets

U.S. PATENT DOCUMENTS

| | | | |
|---|---|---|---|
| 7,317,908 B1 * | 1/2008 | Eason | 455/413 |
| 7,676,364 B2 * | 3/2010 | Rao | 704/235 |
| 2003/0128820 A1 * | 7/2003 | Hirschberg et al. | 379/88.14 |
| 2006/0223502 A1 | 10/2006 | Doulton | |
| 2006/0234680 A1 | 10/2006 | Doulton | |
| 2007/0054678 A1 | 3/2007 | Doulton | |
| 2007/0116204 A1 | 5/2007 | Doulton | |
| 2007/0117543 A1 | 5/2007 | Doulton | |
| 2007/0117544 A1 | 5/2007 | Doulton | |
| 2007/0117545 A1 | 5/2007 | Doulton | |
| 2007/0117547 A1 | 5/2007 | Doulton | |
| 2010/0184409 A1 * | 7/2010 | Doulton | 455/412.1 |

OTHER PUBLICATIONS

Burke, Moira, et al. "Error Correction of Voicemail Transcripts in SCANMail," Apr. 22-27, 2006, 10 pages.

Basson, Sara, et al. "New Accessibility Impacts," http://www.liberatedlearning.com/resources/pdf/RC_2003_IBM_SR_Paper.pdf, 2003, 8 pages.

Whittake, Steve, et al. "SCANMail: A Voicemail Interface That Mkes Speech Browsable, Readable and Searchable," Apr. 20-25, 2002, 8 pages.

Openwave Brochure, "The Value of WAP Push," Dec. 2001, 18 pages.

Openwave Brochure, Comparison of WAP Push and Short Message Service (SMS), Apr. 2002, 10 pages.

Stolcke, et al. "Recent Innovations in Speech-to-Text Transcription at SRI-ICSI-UW" IEEE Transactions on Audio, Speech, and Language Processing, vol. 14, No. 5, Sep. 2006, pp. 1-16.

* cited by examiner

SYSTEM AND METHOD FOR LIMITING VOICEMAIL TRANSCRIPTION

CROSS-REFERENCE TO RELATED APPLICATIONS

This application claims benefit of priority to U.S. Provisional Patent Application Ser. No. 60/911,437 filed 12 Apr. 2007, which is incorporated herein by reference.

BACKGROUND

A subscriber to a cell phone communication provider typically utilizes a voicemail service of the provider for recording messages (voicemails) when unable to answer calls; these voicemail messages may then be replayed later. The cell phone user may also subscribe to a voicemail transcription service that automatically transcribes voicemail messages into text that is then sent to the subscriber as a text and/or email message. To use the voicemail transcription service, the subscriber's cell phone service (e.g., the cell phone communication provider) is configured to forward unanswered calls to a telephone number supplied by the voicemail transcription service. Each call received by the voicemail transcription service is answered and the voice message left by the caller is recorded and stored in a voicemail box assigned to the subscriber of the transcription service. This voicemail is automatically transcribed into text and sent to the subscriber in the form text and/or an email messages. While a valuable service, it is not always desirable to convert all voicemail messages into text, particularly where the cost of the transcription service is based upon the number and/or length of each voicemail.

To control the transcription service, the subscriber must connect to the transcription service (e.g., by calling the voicemail transcription service and/or accessing a web page of the voicemail transcription service) and select one or more options to switch the transcription service on or off. Where a user of the transcription service receives a large volume of voicemail messages, the cost of the voicemail transcription service may be undesirably high. Since the user has no control over the people leaving messages, the only option available to the user is to enable and disable the service, which is a time consuming process and which may result in lost messages.

SUMMARY

One method for limiting voicemail transcription within a voicemail transcription service includes answering a forwarded call from a caller to a subscriber of the voicemail transcription service. An audio message to the caller prompting for the caller to leave a voicemail message is outputted. The audio of the forwarded call is recorded as the voicemail message, and a duration of the recording is measured. The audio is transcribed into text. The steps of recording and transcribing of the audio are terminated upon the occurrence of either the forwarded call ending or the duration of the recording reaching a maximum record time for the forwarded call. The method may be embodied as a software product including instructions for executing the steps of the method.

One system for limiting voicemail transcription includes a call handler, a caller timer, and a transcriber. The call handler answers a forwarded call from a caller to a subscriber and records audio of the call as a voicemail message. The call timer times the recording of audio and stops the recording once the recording duration reaches a maximum recording time limit. The transcriber transcribes the audio into text.

Another method for limiting voicemail transcription within a voicemail transcription service includes answering a forwarded call from a caller to a subscriber of the voicemail transcription service. An audio message to the caller prompting for the caller to leave a voicemail message is outputted. The voicemail message is recorded from audio of the forwarded call, and the audio is transcribed into text. The number of characters transcribed into the text are counted, and the step of transcribing is terminated upon the occurrence of either the number of counted characters reaching a maximum character count or the forwarded call ending. The method may be embodied as a software product including instructions for executing the steps of the method.

Another system for limiting voicemail transcription includes a call handler, a transcriber, and a character counter. The call handler answers a forwarded call from a caller to a subscriber and records audio of the call as a voicemail message. The transcriber transcribes the audio into text, and a character counter counts the number of characters transcribed for the forwarded call. The transcriber stops transcribing the audio into text when the number of transcribed characters reaches a maximum character count.

Another method for limiting voicemail transcription within a voicemail transcription service includes answering a forwarded call from a caller to a subscriber of the voicemail transcription service. An audio message to the caller prompting for the caller to leave a voicemail message is outputted. The voicemail message is recorded from audio of the forwarded call, and the audio is transcribed into text. At least one text message is generated and filled with the text, and the number of filled text messages are counted. The step of generating and filling of text messages is terminated upon the occurrence of either the number of filled text messages reaching a maximum text message count or the forwarded call ending. The text messages are sent to the subscriber. The method may be embodied as a software product including instructions for executing the steps of the method.

Another system for limiting voicemail transcription includes a call handler, a transcriber, and a text message generator. The call handler answers a forwarded call from a caller to a subscriber and records audio of the call as a voicemail message. The transcriber transcribes the audio into text, and the text message generator for generates and fills text messages with the text. The text message counter counts the number of generated and filled text messages and causes the text message generator to stop generating and filling text messages when the text message counter indicates that a maximum number of text messages have been filled.

Another method for limiting voicemail transcription within a voicemail transcription service includes answering a forwarded call from a caller to a subscriber of the voicemail transcription service. An audio message to the caller prompting for the caller to leave a voicemail message is outputted, and the voicemail message is recorded from audio of the forwarded call. It is determined whether the caller ID of the call matches an entry in a transcribe number list, where the transcribe number list includes at least one complete or partially complete phone number for which voicemail messages are to be transcribed. If the caller ID is matched, the audio is transcribed into text, and the step of transcribing is terminated when the call ends. The step of recording is also terminated when the call ends. The method may be embodied as a software product including instructions for executing the steps of the method.

Another system for limiting voicemail transcription includes a call handler and a transcriber. The call handler answers a forwarded call from a caller to a subscriber and records audio of the call as a voicemail message. The call handler further compares a caller ID of the call to a transcribe number list, where the transcribe number list includes at least one complete or partially complete phone number for which voicemail messages are to be transcribed. The call handler causes the transcriber to transcribe the audio of the call into text solely if the caller ID of the call matches an entry in the transcribe number list.

Another method for limiting voicemail transcription within a voicemail transcription service includes answering a forwarded call from a caller to a subscriber of the voicemail transcription service. An audio message to the caller prompting for the caller to leave a voicemail message is outputted. The voicemail message is recorded from audio of the forwarded call. It is determined whether the time that the call is received by the voicemail transcription service is within one or more subscriber-defined transcribe times, where the transcribe times specify at least one time period where the subscriber wishes for voicemail messages to be transcribed. If the time that the call is received is within the transcribe times, the audio of the forwarded call is transcribed into text, and the step of transcribing is terminated when the call ends. The step of recording is also terminated when the call ends. The method may be embodied as a software product including instructions for executing the steps of the method.

Another system for limiting voicemail transcription includes a call handler and a transcriber. The call handler answers a forwarded call from a caller to a subscriber and records audio of the call as a voicemail message. The call handler further compares the time at which the voicemail transcription service received the forwarded call to a transcribe time list, where the transcribe time list includes at least one time period where the subscriber wishes for voicemail messages to be transcribed. The call handler causes the transcriber to transcribe the voicemail message into text solely if the time at which the call handler received the call matches an entry in the transcribe time list.

Another method for limiting voicemail transcription within a voicemail transcription service includes answering a forwarded call from a caller to a subscriber of the voicemail transcription service. An audio message to the caller prompting for the caller to leave a voicemail message is outputted, and the voicemail message is recorded from audio of the forwarded call. The audio is transcribed into text, and the duration of the transcription is measured. The step of transcribing is terminated upon the occurrence of either the forwarded call ending or the duration of the transcription reaching a maximum transcribe time for the forwarded call. The step of recording is terminated upon ending of the forwarded call. The method may be embodied as a software product including instructions for executing the steps of the method.

Another system for limiting voicemail transcription includes a call handler, a transcriber, and a timer. The call handler answers a forwarded call from a caller to a subscriber and records audio of the call as a voicemail message. The transcriber transcribes the audio into text. The timer measures the transcription duration and causes the transcriber to stop transcribing the audio once the transcription duration reaches a maximum transcribe time limit.

DETAILED DESCRIPTION OF THE FIGURES

Figure 1:
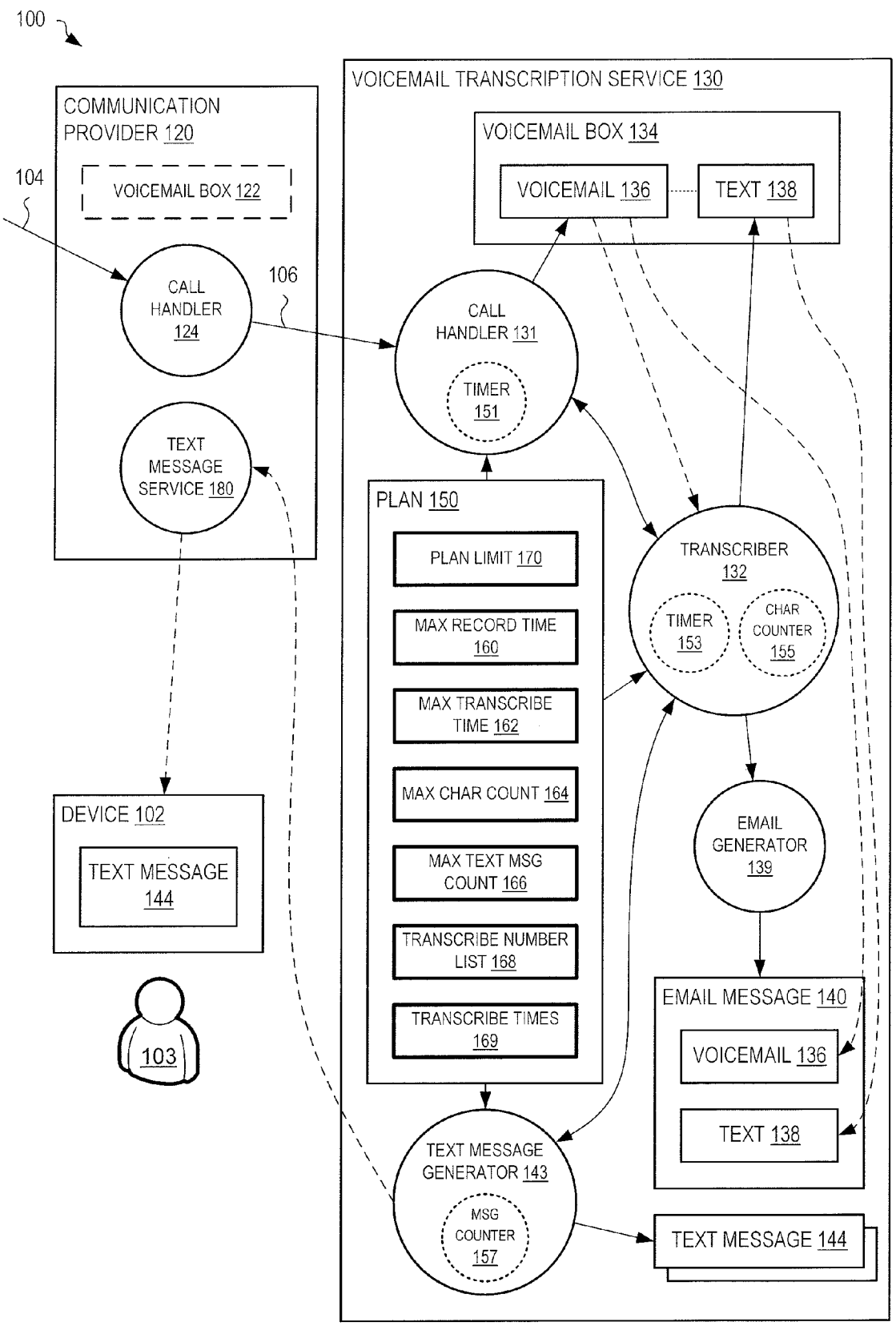
FIG. 1 shows one exemplary system embodiment for limiting voicemail transcription.

Current voicemail transcription services transcribe each received voicemail message, in its entirety, into text. That is, the voicemail transcription service transcribes each received voicemail message into text irrespective of the length of the voicemail message. Where the transcription service is configured to send the transcribed text to a subscriber's mobile communication device in the form of text messages, capacity of the mobile communication device is rapidly exceeded by a lengthy voicemail message. Further, if the subscriber receives many voicemail messages, the cost of the transcription service becomes excessive, since the subscriber has no control of the number of voicemail messages being left. If the voicemail transcription service charges are based upon duration of the transcribed messages, a service plan for twenty minutes per month may be consumed by a single lengthy voicemail message.

Thus systems and methods herein may thus provide advantages in metering, controlling and/or limiting voicemail transcription; they further enable tailoring of voicemail transcription service plans according to individual subscriber needs.

In one embodiment the amount of transcription time is limited for each voicemail message to prevent exhaustion of transcription resources by lengthy voicemail messages. Since the most significant details of a message (i.e., the caller's contact information) are typically left in the first few seconds of the voicemail message, the most important information is transcribed. The subscriber may optionally retrieve the audio of the voicemail message for full playback, if desired.

In another embodiment, the length of the recorded voicemail message is limited. That is, the caller only has a predefined time limit to record her message, after which the voicemail recording is terminated; the limited voicemail message is then transcribed and sent to the subscriber. According to this embodiment, therefore, a minimum number of calls may always be transcribed when the subscriber selects a service plan based upon transcription duration. For example, if a subscriber selects a plan with twenty transcription minutes per month, and also limits each transcription to a duration of twenty seconds per voicemail message, a minimum of sixty voicemail messages will be transcribed without exhausting or exceeding the plan.

In another embodiment, the transcription service plan is based upon the number of characters being transcribed. Consider for example a plan that includes transcription of six thousand transcribed characters per month. In this example, transcription service costs are thus not based upon the duration of each message, but upon the actual information content being transcribed into text. If the average voicemail message is transcribed into three hundred characters, for example, a six thousand character service plan will transcribe twenty voicemail messages each month, on average.

In another embodiment, the transcription service plan allows the subscriber to specify a list of numbers for which transcription may occur. Consider for example a plan that includes transcription based upon a number of transcribed messages per month, but yet which also allows the subscriber to specify a list of phone numbers for which transcription should occur. Since not all received voicemail messages are transcribed into text, the cost of the transcription service to the subscriber may be selectively reduced.

In another embodiment, the transcription service plan allows the subscriber to specify one or more transcription times during which transcription of received voicemail messages occurs. Messages received outside of these specified times are recorded but not transcribed. Since not all received voicemail messages are transcribed into text, the cost of the transcription service to the subscriber may again be selectively reduced.

In another embodiment, a subscriber elects to receive transcribed text in the form of text messages delivered to a mobile communication device and the service plan is based upon a number of text messages. In this embodiment the subscriber may limit transcription of each voicemail message to a pre-defined number of text messages. Consider for example the subscriber who selects a service plan including a maximum of 100 text messages per month and a maximum of two text messages for each voicemail message. Such a subscriber may then receive a minimum of fifty and a maximum of 100 transcribed messages each month using this service plan. Note that a single, very lengthy voicemail message cannot exhaust the monthly transcription service plan limit of 100 text messages and also does not generate too many text messages to overflow the subscriber's communication device.

Through these systems and methods for limiting transcription of voicemail messages, flexible transcription service plans may be configured to suit the needs of each subscriber.

FIG. 1 shows one exemplary system 100 for limiting voicemail transcription. System 100 is shown with a communication provider 120, a voicemail transcription service 130, a communication device 102 and a subscriber 103. Subscriber 103 subscribes to communication provider 120 and to voicemail transcription service 130. Subscriber 103 uses device 102 to communicate with other communication devices (not shown) through communication provider 120. Communication device 102 is, for example, a device capable of audio communication such as a mobile phone, a PDA, a smart phone, etc. Communication provider 120 provides communication services to device 102 and may represent a cellular telephone network provider that wirelessly connects to device 102. But communication provider 120 may alternatively represent a communication provider that utilizes wired connectivity (or other type of physical connection such as a fiber optic connection, etc.) to device 102; that is, communication between device 102 and communication provider 120 is not necessarily wireless.

Communication provider 120 may also provide voicemail functionality to subscriber 103 in association with device 102; FIG. 1 is thus shown with an exemplary voicemail box 122. However, since subscriber 103 utilizes voicemail transcription service 130, voicemail box 122 may not be used and is shown, instead, in dashed outline because it is not required for operation of system 100.

A call handler 124, within communication provider 120, is configured (e.g., by subscriber 103) to forward unanswered calls to device 102 to voicemail transcription service 130. To enable this, voicemail transcription service 130 for example supplies subscriber 103 with a telephone number to which subscriber 103 configures call handler 124 to forward unanswered calls. Voicemail transcription service 130 includes a voicemail box 134, assigned to subscriber 103 in this example, which is used to store voicemail messages recorded of unanswered calls by device 102. A call handler 131, within voicemail transcription service 130, answers these forwarded calls and may record voicemail messages into voicemail box 134.

Voicemail transcription service 130 also includes a transcriber 132 that automatically transcribes voicemail message 136, received by call handler 131, into text 138 that may be stored in association with voicemail message 136. In one example of operation, an unanswered call 104 to device 102 is forwarded by call handler 124 to call handler 131 as call 106. Call handler 131 answers call 106 and prompts the caller to leave a voicemail message. Call handler 131 then records any left message from call 106 into voicemail box 134 as voicemail message 136. Simultaneously, call handler 131 may send audio of call 106 to transcriber 132 for translation into text 138. Although shown within voicemail box 134, text 138 may be stored external to voicemail box 134 without departing from the scope hereof.

Transcriber 132 may also send text 138 to an email generator 139 and/or a text message generator 143. Transcriber 132 may send transcribed text to text message generator 143 while audio of call 106 is being transcribed; that is, transcriber 132 does not necessarily wait until text 138 is complete before sending it to text message generator 143. Text message generator 143 generates at least one text message 144 containing transcribed text from transcriber 132. Upon termination of call 106, as notified by call handler 131 and/or transcriber 132, text message generator 143 sends the at least one text message 144 to subscriber 103. In an example of operation, the at least one text message 144 may be sent to a text message service 180 associated with communication provider 120, which then delivers the at least one text message 144 to device 102.

Transcriber 132 may wait until call 106 terminates and voicemail message 136 and text 138 are complete before invoking email generator 139. Email generator 139 generates an email message 140, including audio of voicemail message 136 and/or text 138, and sends (e.g., using an email server, not shown) email message 140 to subscriber 103. For setup, subscriber 103 may supply one or more email addresses to voicemail transcription service 130 to which email message 140 is sent. Where device 102 is email capable, subscriber 103 may supply an email address for an email account that is accessible by device 102; the subscriber might then disable sending of text message 144 to device 102.

To limit voicemail transcriptions by voicemail transcription service 130, subscriber 103 may select a transcription service plan 150 that defines one or more of: a maximum recording time 160 for each voicemail message, a maximum transcription time 162 for each voicemail message, a maximum character count 164 for each voicemail message transcription, a maximum text message count 166 for each voicemail message transcription, a transcribe number list 168 identifying each caller number for which transcription is to occur, and transcribe times 169 that specify one or more periods of the day when transcription of received voicemail messages may occur. Plan 150 may also have a plan limit 170 that specifies a transcription limit within a predetermined amount of time (e.g., a pre-paid monthly transcription limit).

In the event subscriber 103 subscribes to a plan including plan limit 170, voicemail transcription service 130 may optionally be capable of notifying subscriber 103 of how close subscriber 103 is to reaching this limit. Such notification may be accomplished, for example, by voicemail transcription service 130 including in one or more of text message 144, email message 140, and voice mail message 136 a statement notifying subscriber 103 of how close subscriber 103 is to reaching the limit. For example, consider a situation where subscriber 103 subscribes to a plan 150 including a plan limit 170 limiting transcription time (e.g., maximum number of transcription minutes per month), transcription characters (e.g., maximum number of transcription characters per month), and/or transcribed messages (e.g., maximum number of transcribed messages per month). In this situation, voicemail transcription service 130 could optionally be capable of including in one or more of text message 144, email message 140, and voice mail message 136 a statement specifying the remaining transcription time, transcription characters, and/or transcribed messages available to subscriber 103.

Example A

In a first example, plan 150 is based upon voicemail message minutes with maximum record time 160 specifying a maximum record time for each voicemail message 136 and plan limit 170 specifying a total maximum record time available to the subscriber for recording all voicemail messages within a predetermined time period (e.g., number of pre-paid voicemail recording minutes available to subscriber 103 in each month). In this example, call handler 131 includes a timer 151 that limits, based upon maximum record time 160, the record time of voicemail message 136 from each forwarded call 106. That is, recorded audio of voicemail message 136 does not exceed the duration specified by maximum record time 160. Since voicemail message 136 is limited in duration, operation of transcriber 132 is also limited to maximum record time 160 for each voicemail message 136. Management of voicemail transcription service 130 is thus based upon cumulative duration of voicemail message 136 and plan limit 170, where any use above plan limit 170 within the predetermined time period (e.g., month) incurs additional cost for subscriber 103. Voicemail transcription service 130 optionally notifies subscriber 103 of the portion of the total maximum record time remaining within the predetermined time period upon termination of recording of each voice mail message. This notification is accomplished, for example, by including in one or more of text message 144, email message 140, and/or voice mail message 136 the portion of total maximum record time remaining.

Example B

In another example, plan 150 is based upon transcription minutes with maximum transcribe time 162 defining the maximum amount of each voicemail message 136 to be transcribed and plan limit 170 specifying a total maximum transcription time available to subscriber 103 for transcribing all voicemail messages within a predetermined time period (e.g., number of pre-paid transcription minutes available to subscriber 103 in each month). In this example, transcriber 132 includes a timer 153 that limits the transcription time of voicemail message 136; call handler 131 does not however limit the length of recorded voicemail messages (i.e., voicemail message 136 may contain unlimited audio of forwarded call 106). Thus, even if voicemail message 136 exceeds maximum transcribe time 162, transcription of voicemail message 136 stops after maximum transcribe time 162. If desired, subscriber 103 may interact with voicemail transcription service 130 to hear all of voicemail message 136 even though only part of voicemail message 136 is transcribed into text 138. Management of voicemail transcription service 130 is thus based upon cumulative transcription time for the predetermined time period (e.g., each month) and plan limit 170, where any additional use above plan limit 170 incurs additional cost for subscriber 103. Voicemail transcription service 130 optionally notifies subscriber 103 of the portion of the total maximum transcription time remaining within the predetermined time period upon termination of transcribing a voicemail message. This notification is accomplished, for example, by including in one or more of text message 144, email message 140, and/or voicemail message 136 the portion of the total maximum transcription time remaining.

Example C

In another example, plan 150 is based upon text messages with maximum text message count 166 specifying a maximum number of text messages 144 generated for each voicemail message 136 and plan limit 170 specifying a total maximum number of text messages that may be filled by transcription text within a predetermined time period (e.g., number of pre-paid text messages that may be filled by transcription text in each month). In this example, call handler 131 records forwarded call 106 as voicemail message 136 and simultaneously sends audio of voicemail message 136 to transcriber 132. Transcriber 132 transcribes this audio into text 138 and concurrently sends transcribed text to text message generator 143. Text message generator 143 includes a message counter 157 that counts the number of text messages filled by transcribed text. If message counter 157 indicates that the number of text messages exceeds maximum text message count 166, text message generator 143 stops filling text messages, thereby limiting the number of text messages generated from voicemail message 136 to maximum text message count 166; it may further send a signal to transcriber 132 to stop transcribing the audio of forwarded call 106. Thus, text 138 may be a partial transcription of voicemail message 136. Email generator 139, if output of email messages is selected, generates email message 140 that may include a partial transcription of voicemail message 136.

In one embodiment, if message counter 157 indicates that maximum text message count 166 text messages have been filled, text message generator 143 stops filling text messages, thereby limiting the number of text messages generated to maximum text message count 166. However, transcriber 132 continues to transcribe audio of forwarded call 106 such that text 138 is based upon all of voicemail message 136 upon termination of forwarded call 106. Email generator 139, if output of email messages is selected, generates email message 140 that includes a complete transcription of voicemail message 136.

Voicemail transcription service 130 optionally notifies subscriber 103 of the portion of the total maximum number of text messages that may be filled by transcription text within the predetermined time period remaining upon termination of generating and filling text messages. This notification is accomplished, for example, by including in one or more of text message 144, email message 140, and/or voicemail message 136 the portion of the total maximum number of text messages remaining.

Example D

In another example, plan 150 is based upon the number of characters transcribed, where maximum character count 164 specifies the maximum number of characters to be transcribed for each voicemail message 136 and plan limit 170 specifies a total maximum number of transcription characters available to subscriber 103 within a predetermined time period (e.g., number of pre-paid transcription characters available to subscriber 103 in each month). In this example, call handler 131 records forwarded call 106 as voicemail message 136, simultaneously sends audio of voicemail message 136 to transcriber 132, and transcriber 132 transcribes this audio into text 138. Transcriber 132 includes a character counter 155 that counts the number of characters transcribed for forwarded call 106. If character counter 155 indicates that maximum character count 164 has been reached, transcriber 132 stops transcription of the audio. Thus, text 138 may be a partial transcription of voicemail message 136. Since the number of characters transcribed is limited to maximum character count 164, the number of text messages generated by text message generator 143 is also limited. Voicemail transcription service 130 optionally notifies subscriber 103 of the remaining portion of the total maximum number of transcription characters available to subscriber 103 within the predetermined time period upon termination of transcription of voicemail message 136. This notification is accomplished, for example, by including in one or more of text message 144, email message 140, and/or voicemail message 136 the number of transcription characters remaining.

Example E

Plan 150 may be based upon one or more of the above examples but, in an embodiment, also allows the subscriber to specify a transcribe number list 168 that identifies phone numbers for which transcription is to occur; thus no transcription occurs for phone numbers that are not matched within transcribe number list 168. In the embodiment, transcribe number list 168 lists each complete phone number for which voicemail messages are to be transcribed. Or it may include wild cards within a phone number to match multiple phone numbers; for example, a number within transcribe number list 168 specified as "(123) 123-1234" matches only that caller ID, whereas a number within transcribe number list 168 specified as wild card "(123) 123-*" matches any caller ID where the first six digits are "123123" (i.e., the last four digits are always a match).

In this example, call handler 131 records forwarded call 106 as voicemail message 136. If the caller ID number of call 104 is matched within transcribe number list 168, call handler 131 simultaneously sends audio of voicemail message 136 to transcriber 132, and transcriber 132 transcribes this audio into text 138. Thus, if the caller ID of call 104 is not matched within transcribe number list 168, only voicemail 136 is recorded. The number of voicemail transcriptions made for the subscriber may thereby be selectively reduced.

Example F

Plan 150 may also based upon one or more of the above examples but yet further allow the subscriber to specify, within transcribe times 169, operational periods during which received voicemail messages are transcribed. Transcribe times 169 may include one or more entries, each specifying a start time and a stop time when transcription of voicemail messages may occur. In one example, the subscriber specifies transcription operation between 8 am and 5 pm each day, thereby not using transcriptions resources for calls received outside of working hours. By specifying transcribe times 169, the number of transcriptions made for the subscriber may be selectively reduced.

Although specific examples are illustrated hereinabove, plan 150 may contain other combinations and uses of plan limit 170, maximum record time 160, maximum transcribe time 162, maximum character count 164, maximum text message count 166, transcribe number list 168 and transcribe times 169, without departing from the scope hereof.

Figure 2:
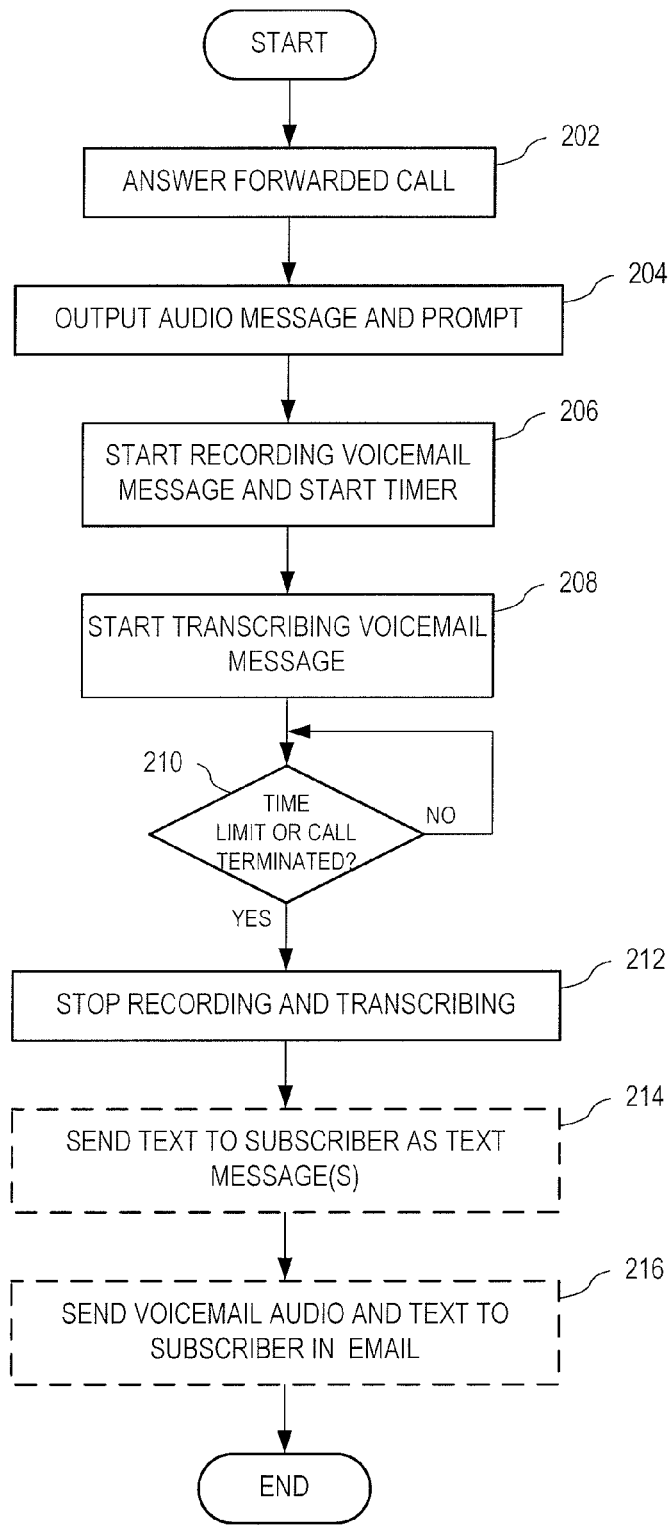
FIG. 2 is a flowchart illustrating one exemplary method embodiment for limiting voicemail transcription based upon message recording time.

FIG. 2 is a flowchart illustrating one exemplary method 200 for limiting voicemail transcription based upon message recording time. Method 200 may operate within call handler 11, transcriber 132, email generator 139 and text message generator 143, FIG. 1. Method 200, for example, is embodied by a software product including instructions for executing the steps of method 200.

In step 202, method 200 answers a forwarded call. In one example of step 202, call handler 131 answers forwarded call 106. In step 204, method 200 outputs a message to the caller prompting for the caller to leave a message. In one example of step 204, call handler 131 plays a recorded message to the caller inviting him to leave a voicemail message. In step 206, method 200 starts recording of a voicemail message and starts a call timer. In one example of step 206, call handler 131 starts recording audio from forwarded call 106 to voicemail message 136 within voicemail box 134 and timer 151 is reset and started. In step 208, method 200 starts transcribing the voicemail message. In one example of step 208, call handler 131 sends audio from forwarded call 106 to transcriber 132 which starts transcribing the audio into text.

Step 210 is a decision. If, in step 210, method 200 determines that a recording time limit has been reached, or that the call has terminated, method 200 continues with step 212; otherwise method 200 continues to wait in step 210 with the forwarded call continuing to be recorded and transcribed. In one example of step 210, call handler 131 determines (a) if timer 151 has reached maximum record time 160 or (b) if call 106 has been terminated. In step 212, method 200 stops recording and transcribing. In one example of step 212, call handler 131 stops recording audio of call 106 to voicemail message 136 and signals transcriber 132 to stop transcribing the audio to text. Step 214 is optional. In step 214, method 200 sends the transcribed text to the subscriber as one or more text messages. In one example of step 214, if elected by the subscriber, one or more text messages 144 are generated by text message generator 143 to include text from text 138 and sent to device 102 via text message service 180 of communication provider 120. Step 216 is also optional. In step 216, method 200 creates an email message that includes the transcribed text and/or recorded audio and sends that email message to the subscriber designated email address. In one example of step 216, if the subscriber has specified at least one email address to voicemail transcription service 130, email generator 139 creates email message 140 that includes voicemail message 136 and/or text 138 and sends email message 140 to the at least one email address supplied by subscriber 103.

Method 200 thus limits the recording duration of each voicemail message 136 and thereby the amount of text 138 that is transcribed therefrom; it thus advantageously limits the number of text messages 144 that are generated and sent to the subscriber. Although in this example the at least one text message 144 is sent to device 102 of subscriber 103, other destinations may be specified by subscriber 103 for these text messages without departing from the scope hereof. Further, text message generator 143 may operate concurrently with transcriber 132 or may start operation once transcriber 132 stops.

Figure 3:
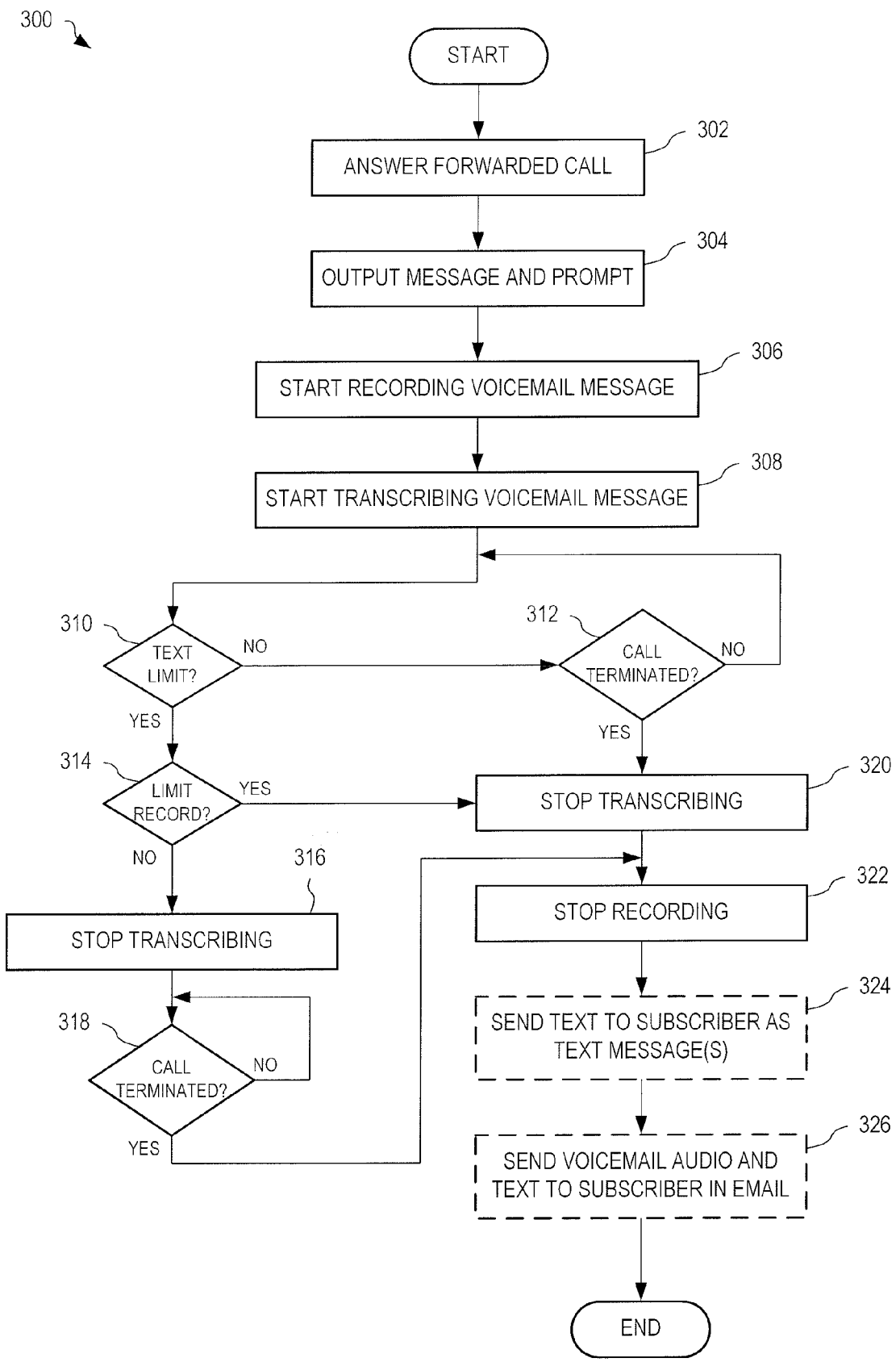
FIG. 3 is a flowchart illustrating one exemplary method embodiment for limiting voicemail transcription based upon transcribed text.

FIG. 3 is a flowchart illustrating one exemplary method 300 for limiting voicemail transcription based upon transcribed text. Method 300 may operate within call handler 131, transcriber 132, email generator 139 and text message generator 143, FIG. 1. Method 300, for example, is embodied by a software product including instructions for executing the steps of method 300.

In step 302, method 300 answers a forwarded call. In one example of step 302, call handler 131 answers forwarded call 106. In step 304, method 300 outputs a message to the caller prompting for the caller to leave a message. In one example of step 304, call handler 131 plays a recorded message to the caller inviting them to leave a voicemail message. In step 306, method 300 starts recording of a voicemail message. In one example of step 306, call handler 131 starts recording audio from forwarded call 106 to voicemail message 136 within voicemail box 134 and also sends the audio to transcriber 132, which resets character counter 155. In step 308, method 300 starts transcribing the voicemail message. In one example of step 308, transcriber 132 starts transcribing the audio, received from call handler 131, into text 138 and character counter 155 counts the number of characters generated by this transcription.

Step 310 is a decision. If, in step 310, method 300 determines that the text transcription limit has been reached, method 300 continues with step 314; otherwise method 300 continues with step 312. In one example of step 310, transcriber 132 determines that character counter 155 has reached a value equal to maximum character count 164. Step 312 is a decision. If, in step 312, method 300 determines that the forwarded call has terminated, method 300 continues with step 320; otherwise method 300 continues with step 310. In one example of step 312, call handler 131 determines that forwarded call 106 has terminated. Steps 310 and 312 thus repeat until either the call terminates or at least maximum character count 164 characters have been transcribed.

Step 314 is a decision. If, in step 314, method 300 determines that recording of the voicemail message is also to be limited, method 300 continues with step 320, otherwise method 300 continues with step 316. In one example of step 314, subscriber 103 may elect plan 150 to terminate recording and transcription of voicemail message 136 when maximum character count 164 characters have been transcribed. In another example, subscriber 103 may elect plan 150 to stop transcription of voicemail message 136 if maximum character count 164 characters have been transcribed, but continue recording of voicemail message 136 until the forwarded call terminates.

In step 316, method 300 stops transcribing audio. In one example of step 316, transcriber 132 stops transcribing audio of call 106 and instructs call handler 131 to stop sending audio of call 106 to transcriber 132. Step 318 is a decision. If, in step 318, method 300 determines that the forwarded call has terminated, method 300 continues with step 322; otherwise method 300 continues with step 318. In one example of step 318, call handler 131 determines that call 106 is still in progress and continues to record audio of call 106 in voicemail message 136.

In step 320, method 300 stops transcribing audio into text. In one example of step 320, transcriber 132 stops transcribing audio of call 106 into text 136. In step 322, method 300 stops recording of audio. In one example of step 322, call handler 131 stops recording audio of call 106 into voicemail message 136.

Step 324 is optional. In step 324, method 300 sends the transcribed text to the subscriber as one or more text messages. In one example of step 324, if elected by the subscriber 103, one or more text messages 144 are generated by text message generator 143 and sent to device 102 via text message service 180 of communication provider 120. Step 326 is also optional. In step 326, method 300 generates an email message that includes the transcribed text and/or recorded audio and sends the email message to the subscriber designated email address. In one example of step 326, if subscriber 103 has specified at least one email address to voicemail transcription service 130, email generator 139 creates email message 140 to include voicemail message 136 and text 138 and sends email message 140 to the at least one email address supplied by the subscriber.

Method 300 thus limits the transcription of voicemail messages by counting the characters generated by transcriber 132 for each message, advantageously limiting the number of text messages 144 that are generated and sent to subscriber 103. Although in this example the at least one text message 144 is sent to device 102 of subscriber 103, other destinations may be specified by subscriber 103 for these text messages without departing from the scope hereof.

Figure 4:
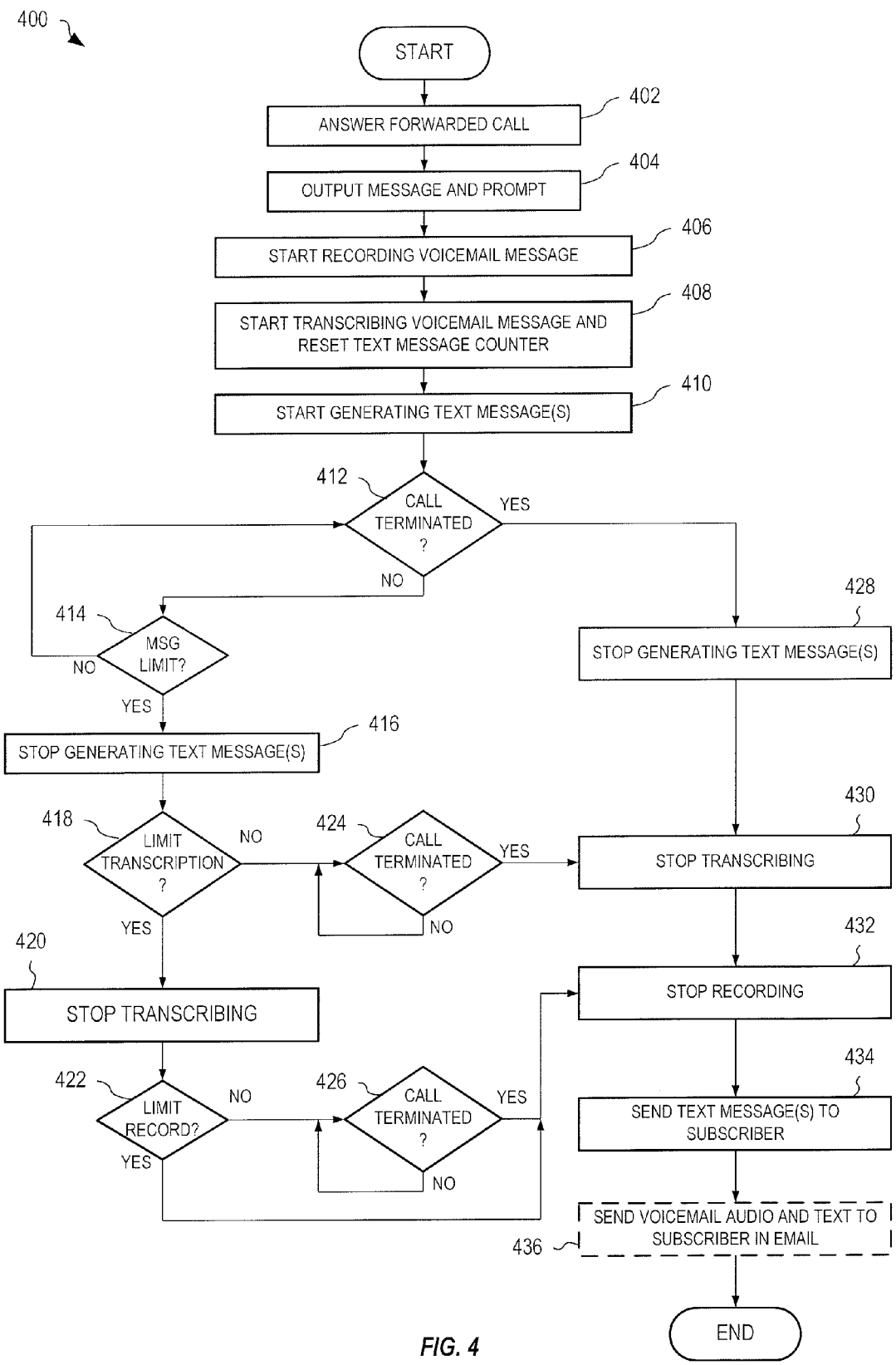
FIG. 4 is a flowchart illustrating one exemplary method embodiment for limiting voicemail transcription based upon text messages.

FIG. 4 is a flowchart illustrating one exemplary method 400 for limiting voicemail transcription based upon text messages. Method 400 may operate within call handler 131, transcriber 132, email generator 139 and text message generator 143, FIG. 1. Method 400, for example, is embodied by a software product including instructions for executing the steps of method 400.

In step 402, method 400 answers a forwarded call. In one example of step 402, call handler 131 answers forwarded call 106. In step 404, method 400 outputs a message to the caller prompting for the caller to leave a message. In one example of step 404, call handler 131 plays a recorded message to the caller inviting her to leave a voicemail message. In step 406, method 400 starts recording of a voicemail message. In one example of step 406, call handler 131 starts recording audio from forwarded call 106 to voicemail message 136 within voicemail box 134; it also sends the audio to transcriber 132. In step 408, method 400 starts transcribing the voicemail message and resets the text message counter. In one example of step 408, transcriber 132 starts transcribing the audio, received from call handler 131, into text and sends this text to text message generator 143, which resets message counter 157. In step 410, transcribed text is stored into at least one text message. In one example of step 410, text message generator 143 stores text received from transcriber 132 into one, two or more text messages 144. For each text message filled by text message generator 143, message counter 157 is incremented.

Step 412 is a decision. If, in step 412, method 400 determines that the forwarded call has terminated, method 400 continues with step 428; otherwise method 400 continues with step 414. In one example of step 412, call handle 131 determines that forwarded call 106 has terminated.

Step 414 is a decision. If, in step 414, method 400 determines that the text message count limit has been reached, method 400 continues with step 416; otherwise method 400 continues with step 412. In one example of step 414, text message generator 143 determines that message counter 157 has reaches a value equal to maximum text message count 166.

Steps 412 and 414 repeat until either the call terminates or until the number of text messages generated exceeds maximum text message count 166.

In step 416, method 400 stops generating text messages. In one example of step 416, text message generator 143 stops filling text messages 144 with transcribed text from transcriber 132. Step 418 is a decision. If, in step 418, method 400 determines that transcription is also to be limited when text message generation stops, method 400 continues with step 420; otherwise method 400 continues with step 424. In one example of step 418, subscriber 103 may elect plan 150 such that transcription is based upon the specified number of text messages, and that further transcription is not necessary (e.g., where subscriber 103 received only text messages and not email messages). In step 420, method 400 stops transcribing audio. In one example of step 420, transcriber 132 stops transcribing audio of call 106 and instructs call handler 131 to stop sending audio of call 106 to transcriber 132.

Step 422 is a decision. If, in step 422, method 400 determines that recording of the voicemail message is also to be stopped when text message generation is stopped, method 400 continues with step 432, otherwise method 400 continues with step 426. In one example of step 422, subscriber 103 may elect plan 150 that terminates recording of voicemail message 136 when a maximum number of text messages exceeds maximum text message count 166. In another example of step 422, subscriber 103 may elect plan 150 to continue recording voicemail message 136 if the number of text messages exceeds maximum text message count 166.

Step 424 is a decision. If, in step 424, method 400 determines that the forwarded call has terminated, method 400 continues with step 430; otherwise method 400 continues with step 424. In one example of step 424, call handler 131 determines that call 106 is still in progress and continues to record audio of call 106 in voicemail message 136 and transcribing text of call 106 in text 138. Step 424 repeats until call 106 terminates.

Step 426 is a decision. If, in step 426, method 400 determines that the forwarded call has terminated, method 400 continues with step 432; otherwise method 400 continues with step 426. In one example of step 426, call handler 131 determines that call 106 is still in progress and continues to record audio of call 106 in voicemail message 136. Step 426 repeats until call 106 terminates.

In step 428, method 400 stops generating text messages. In one example of step 428, text message generator 143 stops filling text messages 144 with transcribed text from transcriber 132. In step 430, method 400 stops transcribing audio into text. In one example of step 430, transcriber 132 stops transcribing audio of call 106 into text 138. In step 432, method 400 stops recording audio. In one example of step 432, call handler 131 stops recording audio of call 106 into voicemail message 136. In step 434, method 400 sends the generated text messages to the subscriber. In one example of step 434, one or more text messages 144 are sent to device 102 via text message service 180 of communication provider 120.

Step 436 is optional. In step 436, method 400 creates an email message that includes the transcribed text and/or recorded audio and sends the email message to the subscriber designated email address. In one example of step 436, if subscriber 103 has specified at least one email address to voicemail transcription service 130 (e.g., within plan 150), email generator 139 creates email message 140 to include voicemail message 136 and text 138 and sends email message 140 to the at least one email address supplied by subscriber 103.

Method 400 thus advantageously limits the transcription of voicemail messages by counting the number of text messages 144 filled with text transcribed by transcriber 132 for each message. Although in this example the at least one text message 144 is sent to device 102 of subscriber 103, other destinations may be specified by subscriber 103 for these text messages without departing from the scope hereof.

Figure 5:
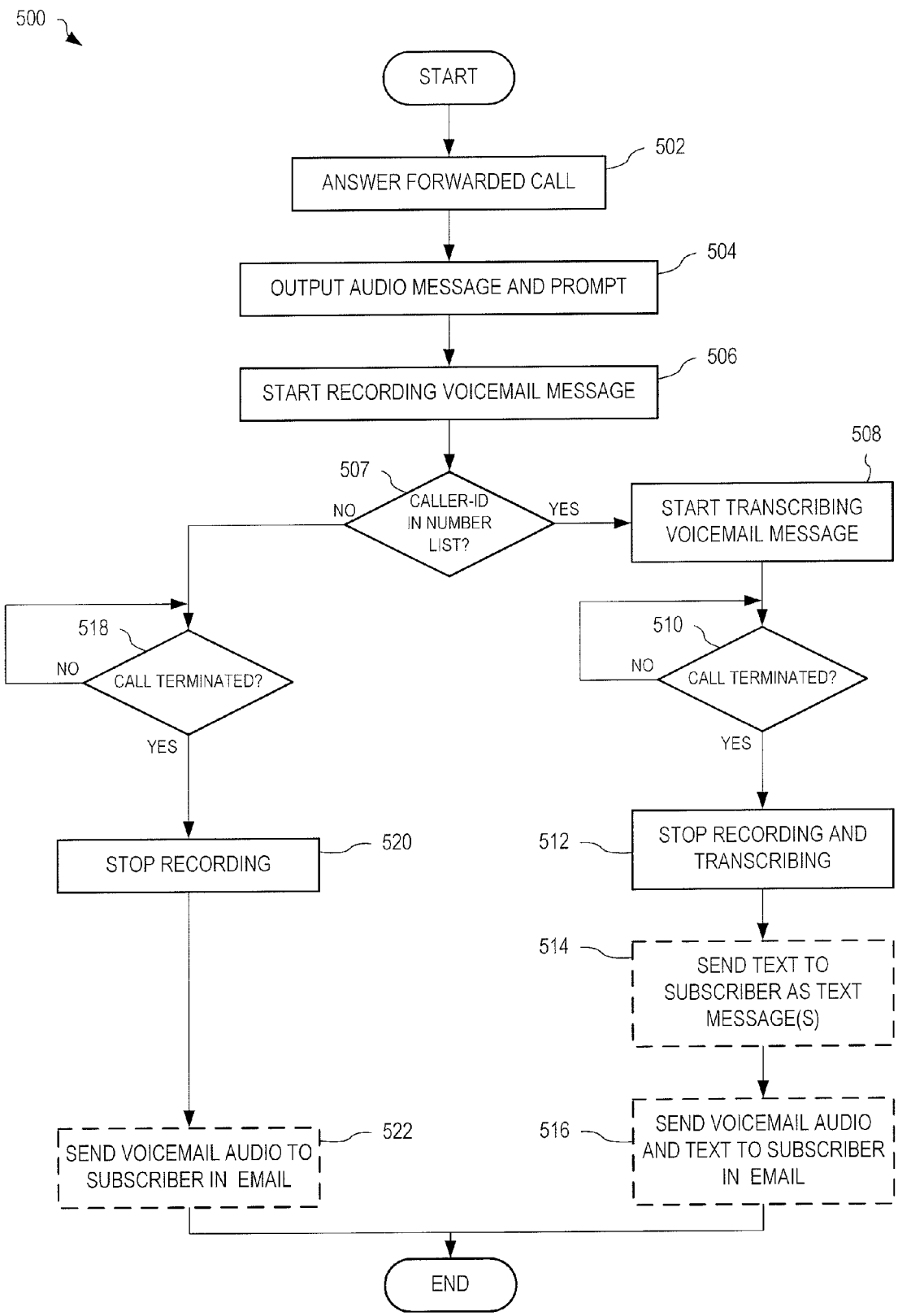
FIG. 5 is a flowchart illustrating one exemplary method embodiment for limiting voicemail transcription based upon a transcribe number list.

FIG. 5 is a flowchart illustrating one exemplary method 500 for limiting voicemail transcription based upon a transcribe number list. Method 500 may operate within call handler 131, transcriber 132, email generator 139 and text message generator 143, FIG. 1. Method 500, for example, is embodied by a software product including instructions for executing the steps of method 500.

In step 502, method 500 answers a forwarded call. In one example of step 502, call handler 131 answers forwarded call 106. In step 504, method 500 outputs a message to the caller prompting for the caller to leave a message. In one example of step 504, call handler 131 plays a recorded message to the caller inviting her to leave a voicemail message. In step 506, method 500 starts recording a voicemail message. In one example of step 506, call handler 131 starts recording audio from forwarded call 106 to voicemail message 136 within voicemail box 134.

Step 507 is a decision. If, in step 507, method 500 determines that the caller ID of the forwarded call is matched in the transcribe number list, method 500 continues with step 508; otherwise method 500 continues with step 518. In one example of step 507, call handler 131 evaluates the caller ID of call 104 against the numbers listed within transcribe number list 168.

In step 508, method 500 starts transcribing the voicemail message. In one example of step 508, call handler 131 sends audio from forwarded call 106 to transcriber 132, which starts transcribing the audio into text.

Step 510 is a decision. If, in step 510, method 500 determines that the call has terminated, method 500 continues with step 512; otherwise method 500 continues to wait in step 510 with the forwarded call continuing to be recorded and transcribed. In one example of step 510, call handler 131 determines if call 106 has been terminated.

In step 512, method 500 stops recording and transcribing. In one example of step 512, call handler 131 stops recording audio of call 106 to voicemail message 136 and signals transcriber 132 to stop transcribing the audio to text. Step 514 is optional. In step 514, method 500 sends the transcribed text to the subscriber as one or more text messages. In one example of step 514, if elected by the subscriber, one or more text messages 144 are generated by text message generator 143 to include text from text 138 that is sent to device 102 via text message service 180 of communication provider 120. Step 516 is also optional. In step 516, method 500 creates an email message that includes the transcribed text and/or recorded audio and sends that email message to the subscriber designated email address. In one example of step 516, if the subscriber has specified at least one email address to voicemail transcription service 130, email generator 139 creates email message 140 that includes voicemail message 136 and/or text 138 and sends email message 140 to the at least one email address supplied by subscriber 103. Method 500 then terminates.

Step 518 is a decision. If, in step 518, method 500 determines that the call has terminated, method 500 continues with step 520; otherwise method 500 continues to wait in step 518 with the forwarded call continuing to be recorded. In one example of step 518, call handler 131 determines if call 106 has been terminated.

In step 520, method 500 stops recording. In one example of step 520, call handler 131 stops recording audio of call 106 to voicemail message 136. Step 522 is optional. In step 522, method 500 creates an email message that includes the recorded audio and sends that email message to the subscriber designated email address. In one example of step 522, if the subscriber has specified at least one email address to voicemail transcription service 130, email generator 139 creates email message 140 that includes voicemail message 136 and sends email message 140 to the at least one email address supplied by subscriber 103. Method 500 then terminates.

Method 500 thus limits transcription to messages of calls with numbers matched within transcribe number list 168. Although in this example the at least one text message 144 is sent to device 102 of subscriber 103, other destinations may be specified by subscriber 103 for these text messages without departing from the scope hereof.

Figure 6:
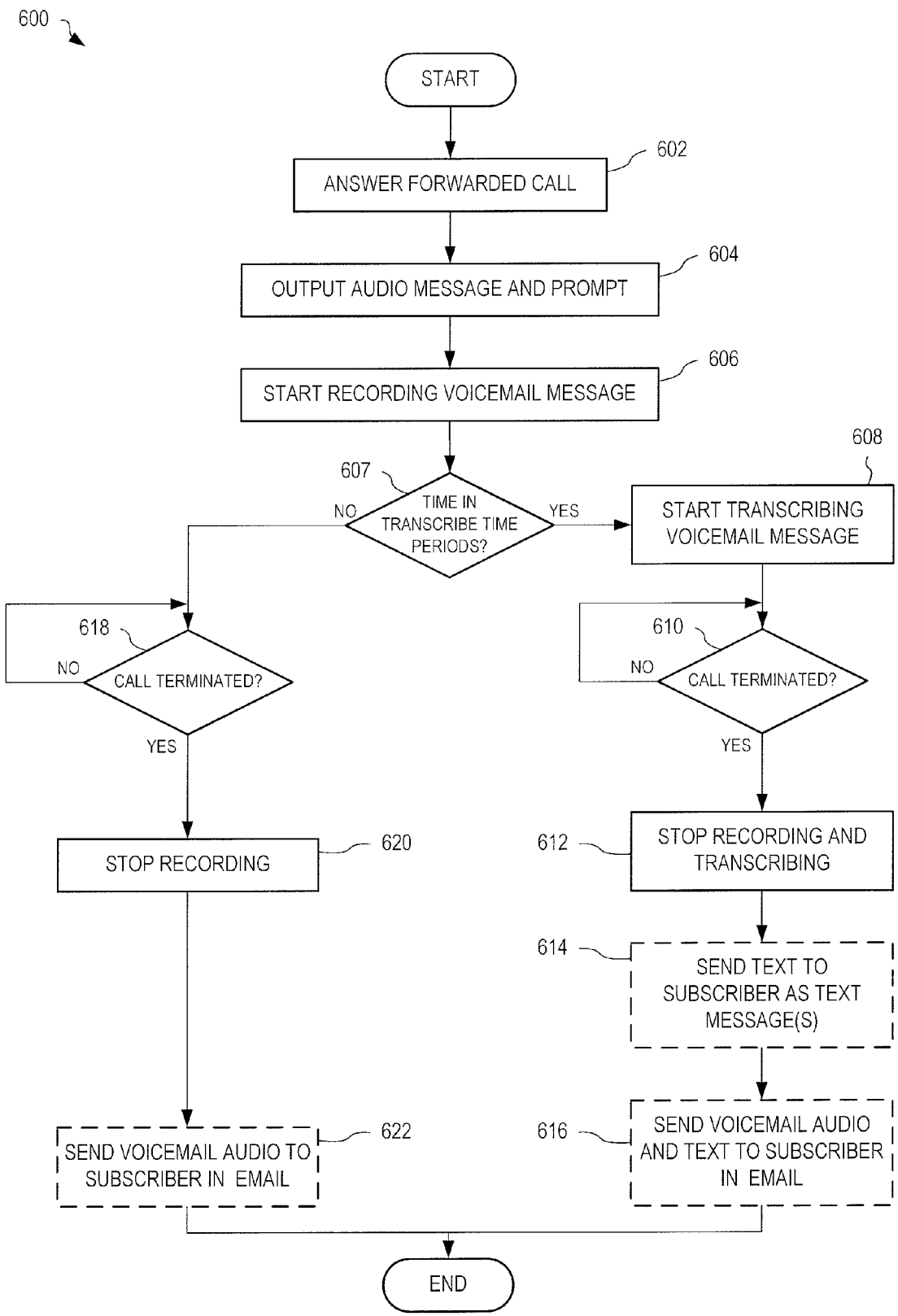
FIG. 6 is a flowchart illustrating one exemplary method embodiment for limiting voicemail transcription based upon transcribe times.

FIG. 6 is a flowchart illustrating one exemplary method 600 for limiting voicemail transcription based upon transcribe times. Method 600 may operate within call handler 131, transcriber 132, email generator 139 and text message generator 143, FIG. 1. Method 600, for example, is embodied by a software product including instructions for executing the steps of method 600.

In step 602, method 600 answers a forwarded call. In one example of step 602, call handler 131 answers forwarded call 106. In step 604, method 600 outputs a message to the caller prompting for the caller to leave a message. In one example of step 604, call handler 131 plays a recorded message to the caller inviting him to leave a voicemail message. In step 606, method 600 starts recording a voicemail message. In one example of step 606, call handle 131 starts recording audio from forwarded call 106 to voicemail message 136 within voicemail box 134.

Step 607 is a decision. If, in step 607, method 600 determines that the current time (i.e., the time the call is received) is within the operational periods specified in the transcribe times, method 600 continues with step 608; otherwise method 600 continues with step 618. In one example of step 607, call handler 131 compares the time call 104 is received against the list of time periods within transcribe times 169 to determine if the voicemail should be transcribed.

In step 608, method 600 starts transcribing the voicemail message. In one example of step 608, call handler 131 sends audio from forwarded call 106 to transcriber 132 which starts transcribing the audio into text.

Step 610 is a decision. If, in step 610, method 600 determines that the call has terminated, method 600 continues with step 612; otherwise method 600 continues to wait in step 610 with the forwarded call continuing to be recorded and transcribed. In one example of step 610, call handler 131 determines if call 106 has been terminated.

In step 612, method 600 stops recording and transcribing. In one example of step 612, call handler 131 stops recording audio of call 106 to voicemail message 136 and signals transcriber 132 to stop transcribing the audio to text. Step 614 is optional. In step 614, method 600 sends the transcribed text to the subscriber as one or more text messages. In one example of step 614, if elected by the subscriber, one or more text messages 144 are generated by text message generator 143 to include text from text 138 that is sent to device 102 via text message service 180 of communication provider 120. Step 616 is also optional. In step 616, method 600 creates an email message that includes the transcribed text and/or recorded audio and sends that email message to the subscriber designated email address. In one example of step 616, if the subscriber has specified at least one email address to voicemail transcription service 130, email generator 139 creates email message 140 that includes voicemail message 136 and/or text 138 and sends email message 140 to the at least one email address supplied by subscriber 103. Method 600 then terminates.

Step 618 is a decision. If, in step 618, method 600 determines that the call has terminated, method 600 continues with step 620; otherwise method 600 continues to wait in step 618 with the forwarded call continuing to be recorded. In one example of step 618, call handler 131 determines if call 106 has been terminated.

In step 620, method 600 stops recording. In one example of step 620, call handler 131 stops recording audio of call 106 to voicemail message 136. Step 622 is optional. In step 622, method 600 creates an email message that includes the recorded audio and sends that email message to the subscriber designated email address. In one example of step 622, if the subscriber has specified at least one email address to voicemail transcription service 130, email generator 139 creates email message 140 that includes voicemail message 136 and sends email message 140 to the at least one email address supplied by subscriber 103. Method 600 then terminates.

Method 600 thus limits transcription to messages of calls arriving at times specified within transcribe times 169. Although in this example the at least one text message 144 is sent to device 102 of subscriber 103, other destinations may be specified by subscriber 103 for these text messages without departing from the scope hereof.

Figure 7:
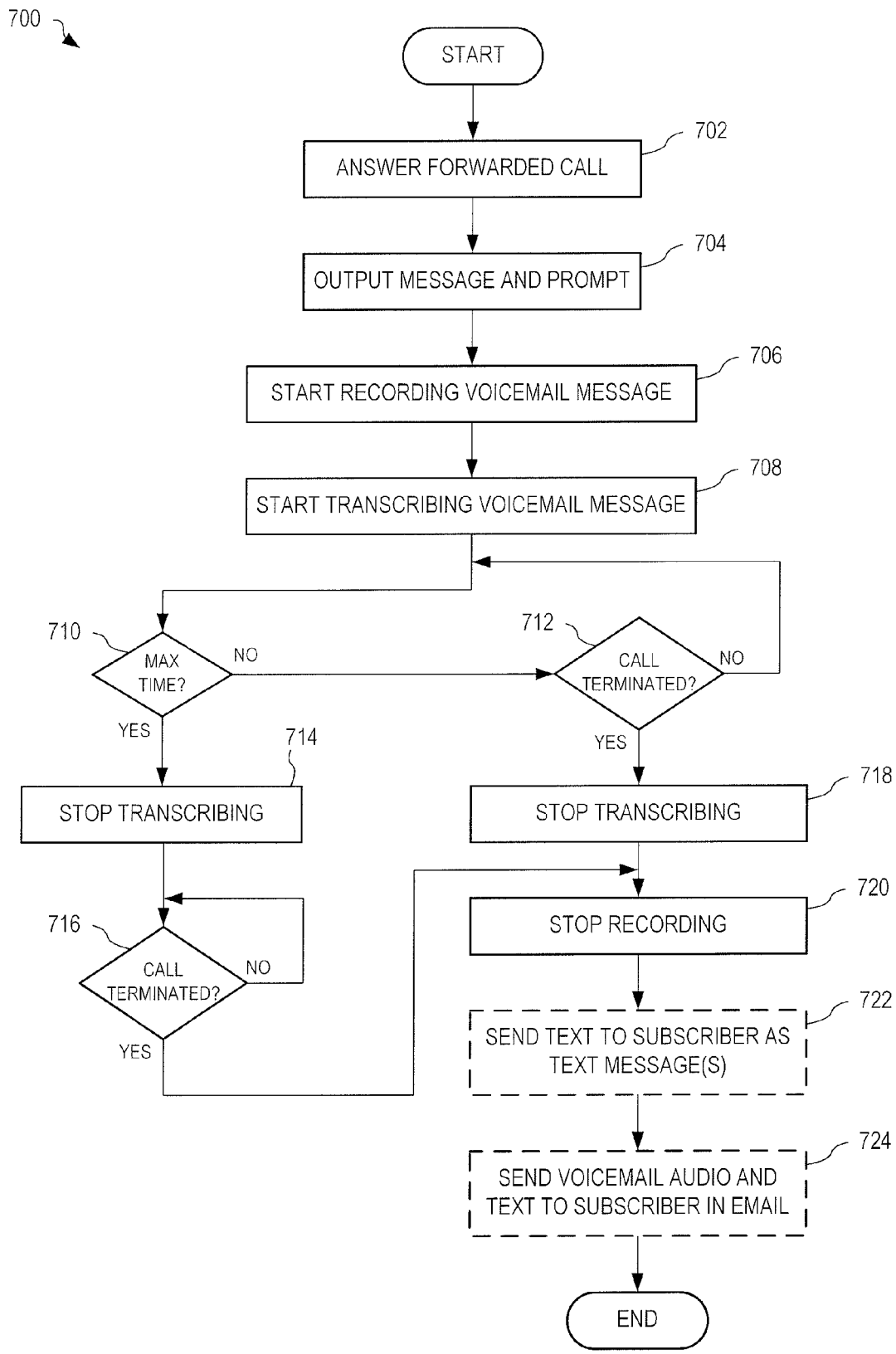
FIG. 7 is a flowchart illustrating one exemplary method embodiment for limiting voicemail transcription based upon maximum transcribe time.

FIG. 7 is a flowchart illustrating one exemplary method 700 for limiting voicemail transcription based upon maximum transcribe time. Method 700 may operate within call handler 131, transcriber 132, email generator 139 and text message generator 143, FIG. 1. Method 700, for example, is embodied by a software product including instructions for executing the steps of method 700.

In step 702, method 700 answers a forwarded call. In one example of step 702, call handler 131 answers forwarded call 106. In step 704, method 700 outputs a message to the caller prompting for the caller to leave a message. In one example of step 704, call handler 131 plays a recorded message to the caller inviting the caller to leave a voicemail message. In step 706, method 700 starts recording of a voicemail message. In one example of step 706, call handler 131 starts recording audio from forwarded call 106 to voicemail message 136 within voicemail box 134 and also sends the audio to transcriber 132, which resets timer 153. In step 708, method 700 starts transcribing the voicemail message 136. In one example of step 708, transcriber 132 starts transcribing the audio, received from call handler 131, into text 138 and timer 153 records the amount of time that transcriber 132 has been transcribing the audio.

Step 710 is a decision. If, in step 710, method 700 determines that a maximum transcribe time for the voicemail message has been reached, method 700 continues with step 714; otherwise method 700 continues with step 712. In one example of step 710, transcriber 132 determines that timer 153 has reached maximum transcribe time 162. Step 712 is a decision. If, in step 712, method 700 determines that the forwarded call has terminated, method 700 continues with step 718; otherwise method 700 continues with step 710. In one example of step 712, call handler 131 determines that forwarded call 106 has terminated. Steps 710 and 712 thus repeat until either the call terminates or the maximum transcribe time has been reached.

In step 714, method 700 stops transcribing audio. In one example of step 714, transcriber 132 stops transcribing audio of call 106 and instructs call handler 131 to stop sending audio of call 106 to transcriber 132. Step 716 is a decision. If, in step 716, method 700 determines that the forwarded call has terminated, method 700 continues with step 720; otherwise method 700 continues with step 716. In one example of step 716, call handler 131 determines that call 106 is still in progress and continues to record audio of call 106 in voicemail message 136.

In step 718, method 700 stops transcribing audio into text. In one example of step 718, transcriber 132 stops transcribing audio of call 106 into text 138. In step 720, method 700 stops recording of audio. In one example of step 720, call handler 131 stops recording audio of call 106 into voicemail message 136.

Step 722 is optional. In step 722, method 700 sends the transcribed text to the subscriber as one or more text messages. In one example of step 722, if elected by the subscriber 103, one or more text messages 144 are generated by text message generator 143 and sent to device 102 via text message service 180 of communication provider 120. Step 724 is also optional. In step 724, method 700 creates an email message that includes the transcribed text and/or recorded audio and sends the email message to the subscriber designated email address. In one example of step 724, if subscriber 103 has specified at least one email address to voicemail transcription service 130, email generator 139 creates email message 140 to include voicemail message 136 and text 138 and sends email message 140 to the at least one email address supplied by the subscriber.

Method 700 thus limits the transcription of voicemail messages by limiting the transcribe time for each message, advantageously limiting the number of text messages 144 that are generated and sent to subscriber 103. Although in this example the at least one text message 144 is sent to device 102 of subscriber 103, other destinations may be specified by subscriber 103 for these text messages without departing from the scope hereof.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for limiting voicemail transcription within a voicemail transcription service, comprising the steps of:
    answering a forwarded call from a caller to a subscriber of the voicemail transcription service;
    outputting an audio message to the caller prompting for the caller to leave a voicemail message;
    recording the voicemail message from audio of the forwarded call;
    measuring a duration of the recording;
    transcribing the audio into text;
    terminating the step of recording and the step of transcribing when the duration of the recording reaches a maximum record time for the forwarded call; and
    notifying the subscriber of what portion of a total maximum record time available to the subscriber for recording all voicemail messages within a predetermined time period remains at the end of the forwarded call.

2. The method of claim 1, further comprising:
    generating one or more text messages including the text; and
    sending the one or more text messages to the subscriber.

3. The method of claim 1, further comprising:
    generating an email message including the text; and
    sending the email message to one or more subscriber designated email addresses.

4. The method of claim 3, the step of generating the email message further comprising attaching the voicemail message to the email message.

5. A system for limiting voicemail transcription, comprising:
    a call handler for answering a forwarded call from a caller to a subscriber and for recording audio of the call as a voicemail message;
    a call timer for timing the recording of audio, the call timer stopping performing the recording once the recording duration reaches a maximum recording time limit; and
    a transcriber for transcribing the audio into text;
    wherein the call handler notifies the subscriber of what portion of a total maximum record time available to the subscriber for recording all voicemail messages within a predetermined time period remains at the end of the forwarded call.

6. The system of claim 5, further comprising a text message generator for generating one or more text messages that include the text and for sending the one or more text messages to a telephone number supplied by the subscriber.

7. The system of claim 5, further comprising an email generator for generating at least one email message that contains the text and for sending the email message to at least one designated email address.

8. A software product comprising instructions, stored on non-transitory computer-readable media, wherein the instructions, when executed by a computer, perform steps for limiting voicemail transcription, comprising:
    instructions for answering a forwarded call from a caller to a subscriber of a voicemail transcription service;
    instructions for outputting an audio message to the caller prompting for the caller to leave a voicemail message;
    instructions for recording the voicemail message from audio of the forwarded call;
    instructions for measuring a duration of the recording;
    instructions for transcribing the audio into text;
    instructions for terminating performing the recording and performing the transcribing when the duration of the recording reaches a maximum record time for the forwarded call; and
    instruction for notifying the subscriber of what portion of a total maximum record time available to the subscriber for recording all voicemail messages within a predetermined time period remains at the end of the forwarded call.

* * * * *